(12) United States Patent
Cheng et al.

(10) Patent No.: US 7,831,070 B1
(45) Date of Patent: Nov. 9, 2010

(54) DYNAMIC FINGER DETECTION MECHANISM FOR A FINGERPRINT SENSOR

(75) Inventors: Ericson W. Cheng, Santa Clara, CA (US); Ricardo Dario Pradenas, Santa Cruz, CA (US); Anthony P. Russo, New York, NY (US); David L. Weigand, Santa Clara, CA (US)

(73) Assignee: Authentec, Inc., Melbourne, FL (US)

( * ) Notice: Subject to any disclaimer, the term of this patent is extended or adjusted under 35 U.S.C. 154(b) by 1169 days.

(21) Appl. No.: 11/060,846

(22) Filed: Feb. 18, 2005

(51) Int. Cl.
*G06K 9/00* (2006.01)
(52) U.S. Cl. ............................... 382/124; 382/218
(58) Field of Classification Search ................ 382/124, 382/218, 228; 324/727; 713/186, 202; 345/157; 709/219; 250/221; 455/414.1; 340/5.52, 340/5.535, 5.82, 5.83; 902/3
See application file for complete search history.

(56) References Cited

U.S. PATENT DOCUMENTS

| | | | |
|---|---|---|---|
| 4,745,301 A | 5/1988 | Michalchik | 307/119 |
| 4,827,527 A | 5/1989 | Morita et al. | 382/4 |
| 4,833,440 A | 5/1989 | Wojtanek | 338/114 |
| 5,283,735 A | 2/1994 | Gross et al. | 364/413.02 |
| 5,327,161 A | 7/1994 | Logan et al. | 345/157 |
| 5,376,913 A | 12/1994 | Pine | 338/114 |
| 5,610,993 A | 3/1997 | Yamamoto | 382/124 |
| 5,612,719 A | 3/1997 | Beernink et al. | 345/173 |
| 5,621,318 A | 4/1997 | Jacobsen et al. | 324/207.22 |
| 5,657,012 A | 8/1997 | Tait | 341/20 |
| 5,666,113 A | 9/1997 | Logan | 341/34 |
| 5,675,309 A | 10/1997 | DeVolpi | 338/68 |
| 5,689,285 A | 11/1997 | Asher | 345/161 |
| 5,740,276 A | 4/1998 | Tomko et al. | 382/210 |
| 5,821,930 A | 10/1998 | Hansen | 345/340 |
| 5,825,352 A | 10/1998 | Bisset et al. | 345/173 |
| 5,825,907 A | 10/1998 | Russo | 382/124 |

(Continued)

FOREIGN PATENT DOCUMENTS

EP    0 973 123 A1    1/2000

(Continued)

OTHER PUBLICATIONS

Choonwoo Ryu et al. "Super-template Generation Using Successive Bayesian Estimation for Fingerprint Enrollment", Jan. 2005 Springer-Verlag Berlin Heidelberg, pp. 710-719.

(Continued)

*Primary Examiner*—Daniel G Mariam
*Assistant Examiner*—Aklilu K Woldemariam
(74) *Attorney, Agent, or Firm*—Allen, Dyer, Doppelt, Milbrath & Gilchrist, P.A.

(57) ABSTRACT

The present invention discloses an apparatus for determining the presence of a patterned object on the surface of a sensor. The apparatus comprises a sensor system coupled to a means for generating a control signal. The sensor system is configured to sense an image corresponding to the patterned object and to translate the image into image data. The means for generating a control signal generates a control signal if statistics of the image data exceed a pre-determined number of threshold levels. In a preferred embodiment, the patterned object is finger with a fingerprint on its surface and the sensor is fingerprint swipe sensor. Preferably, the threshold levels are software programmable.

36 Claims, 10 Drawing Sheets

U.S. PATENT DOCUMENTS

| | | | |
|---|---|---|---|
| 5,828,773 A | 10/1998 | Setlak et al. | |
| 5,841,888 A | 11/1998 | Setlak et al. | |
| 5,845,005 A | 12/1998 | Setlak et al. | |
| 5,852,670 A | 12/1998 | Setlak et al. | |
| 5,862,248 A | 1/1999 | Salatino et al. | |
| 5,880,411 A | 3/1999 | Gillespie et al. | 178/18.01 |
| 5,889,507 A | 3/1999 | Engle et al. | 345/161 |
| 5,903,225 A | 5/1999 | Schmitt et al. | |
| 5,907,327 A | 5/1999 | Ogura et al. | 345/339 |
| 5,909,211 A | 6/1999 | Combs et al. | 345/172 |
| 5,910,286 A | 6/1999 | Lipskier | |
| 5,920,640 A | 7/1999 | Salatino et al. | |
| 5,940,526 A | 8/1999 | Setlak et al. | |
| 5,943,052 A | 8/1999 | Allen et al. | 345/341 |
| 5,953,441 A | 9/1999 | Setlak | |
| 5,956,415 A | 9/1999 | McCalley et al. | |
| 5,963,679 A * | 10/1999 | Setlak | 382/312 |
| 5,982,894 A | 11/1999 | McCalley et al. | |
| 5,995,084 A | 11/1999 | Chan et al. | 345/173 |
| 5,995,623 A | 11/1999 | Kawano et al. | 380/21 |
| 5,995,630 A | 11/1999 | Borza | 380/54 |
| 6,011,589 A | 1/2000 | Matsuura et al. | |
| 6,011,849 A | 1/2000 | Orrin | 380/42 |
| 6,021,211 A | 2/2000 | Setlak et al. | |
| 6,028,773 A | 2/2000 | Hundt | |
| 6,035,398 A | 3/2000 | Bjorn | 713/186 |
| 6,047,281 A | 4/2000 | Wilson et al. | |
| 6,047,282 A | 4/2000 | Wilson et al. | |
| 6,057,540 A | 5/2000 | Gordon et al. | |
| 6,057,830 A | 5/2000 | Chan et al. | 345/157 |
| 6,061,051 A | 5/2000 | Chan et al. | 345/173 |
| 6,061,464 A | 5/2000 | Leger | |
| 6,067,368 A | 5/2000 | Setlak et al. | |
| 6,069,970 A | 5/2000 | Salatino et al. | |
| 6,070,159 A | 5/2000 | Wilson et al. | |
| 6,088,471 A | 7/2000 | Setlak et al. | |
| 6,088,585 A | 7/2000 | Schmitt et al. | |
| 6,098,330 A | 8/2000 | Schmitt et al. | |
| 6,135,958 A | 10/2000 | Mikula-Curtis et al. | 600/443 |
| 6,141,753 A | 10/2000 | Zhao et al. | 713/176 |
| 6,181,807 B1 | 1/2001 | Setlak et al. | |
| 6,208,329 B1 | 3/2001 | Ballare | 345/173 |
| 6,219,793 B1 | 4/2001 | Li et al. | 713/202 |
| 6,219,794 B1 | 4/2001 | Soutar et al. | 713/202 |
| 6,239,790 B1 | 5/2001 | Martinelli et al. | |
| 6,248,655 B1 | 6/2001 | Machida et al. | 438/597 |
| 6,256,022 B1 * | 7/2001 | Manaresi et al. | 345/174 |
| 6,259,804 B1 | 7/2001 | Setlak et al. | 382/124 |
| 6,278,443 B1 | 8/2001 | Amro et al. | 345/173 |
| 6,289,114 B1 | 9/2001 | Mainguet | |
| 6,317,508 B1 | 11/2001 | Kramer et al. | |
| 6,323,846 B1 | 11/2001 | Westerman et al. | 345/173 |
| 6,330,345 B1 | 12/2001 | Russo et al. | 382/115 |
| 6,337,918 B1 | 1/2002 | Holehan | |
| 6,376,393 B1 | 4/2002 | Newton et al. | |
| 6,400,836 B2 | 6/2002 | Senior | |
| 6,404,900 B1 | 6/2002 | Qian et al. | 382/103 |
| 6,408,087 B1 | 6/2002 | Kramer | |
| 6,442,286 B1 | 8/2002 | Kramer | |
| 6,459,804 B2 | 10/2002 | Mainguet | |
| 6,483,931 B2 | 11/2002 | Kalnitsky et al. | |
| 6,501,284 B1 | 12/2002 | Gozzini | |
| 6,512,381 B2 | 1/2003 | Kramer | |
| 6,515,488 B1 | 2/2003 | Thomas | |
| 6,518,560 B1 | 2/2003 | Yeh et al. | 250/214 |
| 6,535,622 B1 | 3/2003 | Russo et al. | 382/124 |
| 6,546,122 B1 | 4/2003 | Russo | 382/125 |
| 6,563,101 B1 | 5/2003 | Tullis | 250/208.1 |
| 6,580,816 B2 | 6/2003 | Kramer et al. | |
| 6,601,169 B2 | 7/2003 | Wallace, Jr. et al. | 713/151 |
| 6,603,462 B2 | 8/2003 | Matusis | |
| 6,628,812 B1 | 9/2003 | Setlak et al. | |
| 6,654,484 B2 | 11/2003 | Topping | |
| 6,661,631 B1 | 12/2003 | Meador et al. | 361/93.1 |
| 6,667,439 B2 | 12/2003 | Salatino et al. | |
| 6,668,072 B1 | 12/2003 | Hribernig et al. | 382/124 |
| 6,681,034 B1 | 1/2004 | Russo | 382/125 |
| 6,683,971 B1 | 1/2004 | Salatino et al. | |
| 6,744,910 B1 | 6/2004 | McClurg et al. | 382/124 |
| 6,754,365 B1 | 6/2004 | Wen et al. | 382/100 |
| 6,804,378 B2 | 10/2004 | Rhoads | 382/100 |
| 6,876,756 B1 | 4/2005 | Vieweg | 382/124 |
| 6,961,452 B2 | 11/2005 | Fujii | 382/125 |
| 7,002,553 B2 | 2/2006 | Shkolnikov | 345/169 |
| 7,003,670 B2 | 2/2006 | Heaven et al. | 713/186 |
| 7,020,270 B1 | 3/2006 | Ghassabian | 379/368 |
| 7,054,470 B2 | 5/2006 | Bolle et al. | 382/124 |
| 7,113,179 B2 | 9/2006 | Baker et al. | 345/178 |
| 7,136,514 B1 | 11/2006 | Wong | 382/124 |
| 7,197,168 B2 | 3/2007 | Russo | 382/125 |
| 7,263,212 B2 | 8/2007 | Kawabe | 382/124 |
| 7,280,679 B2 | 10/2007 | Russo | 382/124 |
| 7,299,360 B2 | 11/2007 | Russo | 713/182 |
| 7,339,572 B2 | 3/2008 | Schena | 345/156 |
| 7,369,688 B2 | 5/2008 | Ser et al. | 382/124 |
| 2001/0026636 A1 | 10/2001 | Mainguet | |
| 2001/0032319 A1 | 10/2001 | Setlak | |
| 2001/0043728 A1 | 11/2001 | Kramer et al. | |
| 2002/0054695 A1 | 5/2002 | Bjorn et al. | |
| 2002/0130673 A1 | 9/2002 | Pelrine et al. | 324/727 |
| 2002/0164057 A1 | 11/2002 | Kramer et al. | |
| 2002/0186203 A1 | 12/2002 | Huang | 345/157 |
| 2002/0188854 A1 | 12/2002 | Heaven et al. | 713/186 |
| 2003/0002718 A1 | 1/2003 | Hamid | 382/124 |
| 2003/0016849 A1 | 1/2003 | Andrade | |
| 2003/0021495 A1 | 1/2003 | Cheng | |
| 2003/0025606 A1 | 2/2003 | Sabatini | |
| 2003/0028811 A1 | 2/2003 | Walker et al. | |
| 2003/0035568 A1 | 2/2003 | Mitev et al. | |
| 2003/0035572 A1 | 2/2003 | Kalnitsky et al. | |
| 2003/0044051 A1 | 3/2003 | Fujieda | 382/124 |
| 2003/0095691 A1 | 5/2003 | Nobuhara et al. | |
| 2003/0108227 A1 | 6/2003 | Philomin et al. | |
| 2003/0115490 A1 | 6/2003 | Russo et al. | 713/202 |
| 2003/0123714 A1 | 7/2003 | O'Gorman et al. | 382/124 |
| 2003/0126448 A1 | 7/2003 | Russo | |
| 2003/0135764 A1 * | 7/2003 | Lu | 713/202 |
| 2003/0214481 A1 | 11/2003 | Xiong | 345/157 |
| 2003/0215116 A1 * | 11/2003 | Brandt et al. | 382/124 |
| 2004/0014457 A1 | 1/2004 | Stevens | 455/414.1 |
| 2004/0128521 A1 | 7/2004 | Russo | 713/186 |
| 2004/0148526 A1 | 7/2004 | Sands et al. | 713/202 |
| 2004/0156538 A1 | 8/2004 | Greschitz et al. | 382/124 |
| 2004/0186882 A1 | 9/2004 | Ting | 709/202 |
| 2004/0208348 A1 | 10/2004 | Baharav et al. | 382/124 |
| 2004/0252867 A1 * | 12/2004 | Lan et al. | 382/124 |
| 2004/0258282 A1 * | 12/2004 | Bjorn et al. | 382/124 |
| 2004/0263479 A1 | 12/2004 | Shkolnikov | 345/169 |
| 2005/0012714 A1 | 1/2005 | Russo et al. | 345/157 |
| 2005/0041885 A1 | 2/2005 | Russo | 382/289 |
| 2005/0144329 A1 | 6/2005 | Tsai et al. | 710/1 |
| 2005/0169503 A1 | 8/2005 | Howell et al. | 382/115 |
| 2005/0179657 A1 | 8/2005 | Russo et al. | 345/163 |
| 2005/0259851 A1 | 11/2005 | Fyke | 382/124 |
| 2005/0259852 A1 | 11/2005 | Russo | 382/124 |
| 2006/0002597 A1 | 1/2006 | Rowe | 382/124 |
| 2006/0034043 A1 | 2/2006 | Hisano et al. | 361/681 |
| 2006/0078174 A1 | 4/2006 | Russo | 382/121 |
| 2006/0103633 A1 | 5/2006 | Gioeli | 345/173 |
| 2006/0242268 A1 | 10/2006 | Omernick et al. | 709/219 |
| 2006/0280346 A1 | 12/2006 | Machida | 382/124 |
| 2007/0014443 A1 | 1/2007 | Russo | 382/124 |
| 2007/0016779 A1 | 1/2007 | Lyle | 713/169 |
| 2007/0034783 A1 | 2/2007 | Eliasson et al. | 250/221 |

| | | | |
|---|---|---|---|
| 2007/0038867 A1 | 2/2007 | Verbauwhede et al. | 713/186 |
| 2007/0061126 A1 | 3/2007 | Russo et al. | 703/24 |
| 2007/0067642 A1 | 3/2007 | Singhal | 713/186 |
| 2007/0125937 A1 | 6/2007 | Eliasson et al. | 250/221 |
| 2007/0146349 A1 | 6/2007 | Errico et al. | 345/174 |
| 2007/0274575 A1 | 11/2007 | Russo | 382/124 |
| 2008/0013808 A1 | 1/2008 | Russo et al. | 382/125 |

FOREIGN PATENT DOCUMENTS

| | | |
|---|---|---|
| EP | 1 113 383 A2 | 7/2001 |
| EP | 1 113 405 A2 | 7/2001 |
| EP | 1 143 374 B1 | 2/2005 |
| JP | 2000-48208 | 2/2000 |
| JP | 2000-056877 A | 2/2000 |
| WO | WO 98/15225 | 4/1998 |
| WO | WO 98/52145 | 11/1998 |
| WO | WO 98/52146 | 11/1998 |
| WO | WO 98/52147 | 11/1998 |
| WO | WO 98/52157 | 11/1998 |
| WO | WO 99/43258 | 9/1999 |
| WO | WO 00/68873 | 11/2000 |
| WO | WO 00/68874 | 11/2000 |
| WO | WO 00/72507 A1 | 11/2000 |
| WO | WO 01/09819 A1 | 2/2001 |
| WO | WO 01/09936 A1 | 2/2001 |
| WO | WO 01/29731 A1 | 4/2001 |
| WO | WO 01/39134 A3 | 5/2001 |
| WO | WO 01/65470 A1 | 9/2001 |
| WO | WO 01/73678 A1 | 10/2001 |
| WO | WO 01/77994 A1 | 10/2001 |
| WO | WO 01/80166 A3 | 10/2001 |
| WO | WO 01/94892 A3 | 12/2001 |
| WO | WO 01/94902 A2 | 12/2001 |
| WO | WO 01/94966 A2 | 12/2001 |
| WO | WO 01/95305 A1 | 12/2001 |
| WO | WO 01/99035 A2 | 12/2001 |
| WO | WO 01/99036 A2 | 12/2001 |
| WO | WO 02/15209 A3 | 2/2002 |
| WO | WO 02/15267 A2 | 2/2002 |
| WO | WO 02/44998 A1 | 6/2002 |
| WO | WO 02/069386 A1 | 9/2002 |
| WO | WO 02/071313 A1 | 9/2002 |
| WO | WO 02/073375 A2 | 9/2002 |
| WO | WO 02/086800 A1 | 10/2002 |
| WO | WO 02/093462 A1 | 11/2002 |
| WO | WO 02/095349 A1 | 11/2002 |
| WO | WO 03/007127 A2 | 1/2003 |
| WO | WO 03/017211 A2 | 2/2003 |
| WO | WO 03/049011 A1 | 6/2003 |
| WO | WO 03/049012 A2 | 6/2003 |
| WO | WO 03/049016 A2 | 6/2003 |
| WO | WO 03/049104 A1 | 6/2003 |
| WO | WO 03/075210 A2 | 9/2003 |

OTHER PUBLICATIONS

Dongjae Lee et al. "Fingerprint Fusion Based on Minutiae and Ridge for Enrollment", Jan. 2003 Springer-Verlag Berlin Heidelberg, pp. 478-485.

Koichi Sasakawa et al. "Personal Verification System with High Tolerance of Poor Quality Fingerprints", May 1990 Machine Vision Systems Integration in Industry, pp. 265272.

Michal Irani et al. "Improving Resolution by Image Registration", May 1991 by Academic Press, Inc., pp. 231-239.

Qinfen Zheng et al. "A Computational Vision Approach to Image Registration", Aug. 1992 IEEE, pp. 193-197.

Wei-Yun Yau et al. "Fingerprint Templates Combination", Jan. 2004 Springer-Verlag Berlin Heidelberg, pp. 449-460.

Xudong Jiand et al. "Detecting the Fingerprint Minutiae by Adaptive Tracing the Gray-Level Ridge", May 2001, pp. 999-1013, Published by Elsevier Science Ltd.

Xudong Jiang et al. "Fingerprint Minutiae Matching Based on the Local and Global Structures", Sep. 2000 Ieee, pp. 1038-1041.

Jacob O. Wobbrock, Brad A. Myers, Htet Htet Aung, and Edmond F. LoPresti, Text Entry from Power Wheelchairs: EdgeWrite for Joysticks and Touchpads, pp. 110-117, Human-Computer Interaction Institute School of Computer Science Carnegie Mellon University, Pittsburg, PA 15213 USA.

Ballard and Brown, "*Computer Vision*" Prentice Hall, 1982, pp. 66-69.

Xudong Jiang et al., "Fingerprint Minutiae Matching Based on the Local and Global Structures," Sep. 2000, pp. 1038-1041, IEEE.

Kyung Deok Yu et al., "A Fingerprint Matching Algorithm based on Radial Structure and a Structure-Rewarding Scoring Strategy," Jun. 2005, pp. 656-664, AVBPA, LNCS, Audio- and Video-Based Biometric Person Authentication, Springer-Verlag Berlin Heidelberg.

"*Fingernail Touch Sensors: Spatially Distributed Measurement and Hemodynamic Modeling*", Stephen Mascaro and H. Harry Asada, 2000 IEEE, pp. 3422-3427.

S. Shigematsu et al., "A Single-Chip Fingerprint Sensor and Identifier", IEEE Journal of Solid-State Circuits, vol. 34, No. 12, Dec. 1999, pp. 1852-1859.

I-Control, PDS 3000 TM Product Brief "Mobile Finger -Based Control Sensor", 2 pages, Jul. 2003.

A. Conry-Murray, "Biometrics", http://www.networkmagazine.com/shared/article/showArticle.jhtml?articleId=17601104, Jul. 7, 2002, pp. 1 of 5.

Ballard and Brown, "Computer Vision", Prentice Hall, 1982, pp. 66-69.

* cited by examiner

DYNAMIC FINGER DETECTION MECHANISM FOR A FINGERPRINT SENSOR

FIELD OF THE INVENTION

This invention is related to biometric image sensors. More particularly, this invention is related to systems for and methods of determining the presence of a finger on a fingerprint image sensor.

BACKGROUND OF THE INVENTION

Fingerprint image sensors are used in many applications. In one system, a sensor and a host platform together form a fingerprint image processing system. The sensor reads the fingerprint image and converts it to a digital representation. This digital image is transmitted to the host. The host extracts the unique features of the fingerprint, which include minutiae (ridge endings and bifurcations), ridges, valleys, pores, and scars, and converts them into a template, a more compact digital representation of the image. In a first step, the host processes the image and extracts the template, and later compares the template to those stored for authorized users. If a match is found, in the second step the system authenticates the user or performs some other task.

As part of sensing a fingerprint image, the sensor continually scans its surface for any image and periodically transmits an interrupt to the host. After receiving the interrupt, the host reads and processes the corresponding digital image data. If the host determines that the image data correspond to a fingerprint, the host can authenticate the user or perform another task. Otherwise, the host ignores the image data and returns to tasks it was performing when it was interrupted. In such systems, smudges or other residual material (films, perspiration, dirt, oils, etc.) are read by the sensor and sent to the host for processing. This requires valuable processing time of the host to determine whether the image is of a usable print or is even a print at all. This use of processing resources is wasteful, unnecessarily generating interrupts to the host processor, diverting the processor from performing other tasks.

SUMMARY OF THE INVENTION

In accordance with embodiments of the present invention, a fingerprint sensor system interrupts a host system only after it has determined that a finger is present upon a fingerprint sensor. In this way, the host system is not unnecessarily interrupted when no finger is present upon the sensor and thus there is no digital fingerprint image data to process. The host system is thus able to use its processing time more efficiently, and to devote processing time to other tasks that are ready to be processed.

Also in accordance with embodiments of the present invention, a finger sensor system continually checks for the presence of a finger. The finger sensor system comprises a capacitive detector as well as other electronic components that draw power and generate heat. The electronic components are in a quiescent state, conserving power, until the capacitive detector detects a capacitance related to the presence of a near field object. When a threshold capacitance is detected, the electronic components are enabled so that an image can be read and processed.

In accordance with a first aspect of the present invention, an apparatus for determining the presence of a patterned object comprises a sensor system for sensing an image corresponding to the patterned object and translating the image into image data, a means for determining one or more values in response to the image data, and a means for generating a control signal in the event the one or more values exceed a pre-determined number of threshold levels. The sensor system is coupled to the means for determining, which is coupled to the means for generating. In a preferred embodiment, the sensor system comprises a biometric image sensor coupled to a signal converter. The sensor system further comprises a memory coupled to the signal converter and a processor. The memory contains one or more output lines for coupling to a host system. The processor is coupled to the biometric sensor, the signal converter, the memory, and the means for determining. Preferably, the signal converter comprises an analog-to-digital converter.

In another embodiment, the biometric image sensor is a fingerprint image sensor. Preferably, the fingerprint image sensor is a swipe sensor, but alternatively, it is a placement sensor. Preferably, the sensor is a capacitive sensor, but it can alternatively be any finger print sensor including, but not limited to, a thermal or an optical sensor.

In another embodiment, the means for determining comprises a software programmable capacitance detection engine to enable the first statistical engine coupled to the analog-to-digital converter and the processor; a second statistical engine coupled to the memory, the first statistical engine, and the processor; and an ac-energy-estimation engine coupled to the memory and the processor. The means for determining further comprises first, second, and third comparators. The first comparator is coupled to the first statistical engine and the processor and is configured to generate a first output when the output of the first statistical engine exceeds a first threshold value. The second comparator is coupled to the second statistical engine and the processor and is configured to generate a second output when the output of the second statistical engine exceeds a second threshold value. The third comparator is coupled to the ac-energy-estimation engine and the processor and is configured to generate a third output when the output of the ac-energy-estimation engine exceeds a third threshold value.

In another embodiment, the apparatus further comprises a software programmable detection engine coupled to and configured to enable the analog-to-digital converter, the first statistical engine, and the ac-energy-estimation engine. Preferably, the software programmable detection engine comprises a software programmable capacitive bridge. The software programmable capacitive bridge comprises one or more capacitors configured to be programmed to a detection threshold level.

Preferably, the first statistical engine is a mean engine and the first comparator is a mean comparator; the second statistical engine is a variance engine and the second comparator is a variance comparator; and the third comparator is an ac-energy-estimation comparator.

In this embodiment, the first threshold value is related to a mean of image data, the second threshold value is related to a variance of the image data, and the third threshold value is related to an ac-energy-estimate of the image data. Preferably, at least one of the first comparator, the second comparator, and the third comparator is configured to be programmed with corresponding threshold values.

In another embodiment, the sensor system comprises a software programmable capacitive detector to detect change in capacitance caused by a near field object. Upon detection this threshold programmable capacitive detector enables pre-determined components of the sensor system including at least one of the analog-to-digital converter, the first statistical engine, the second statistical engine, and the ac-energy-estimation engine.

In another embodiment using thresholds crossings, the thresholds in the ac-energy-estimation engine are dynamically set by a software programmable delta and are centered around the mean from the mean engine. Alternatively the programmable delta can be tied to the variance from the variance engine.

In another embodiment the capacitive detector can be self adjusting and automatically configure the threshold based on long term history.

In another embodiment, the apparatus further comprises a host platform coupled to the means for determining, whereby the memory output lines couple the memory to the host system.

The host platform comprises an interrupt signal line coupled to at least one of the first comparator, the second comparator, and the third comparator. The means for generating comprises a voter logic circuit comprising the interrupt signal line. The voter logic circuit is coupled to outputs of each of the first comparator, the second comparator, and the third comparator.

In this embodiment, the host platform comprises one of a personal computer or a portable device selected from the group consisting of a telephone, a personal digital assistant, a personal music player, and a camera.

In another embodiment, the host platform is configured to receive at least one of the output from the first comparator, the output from the second comparator, and the output from the third comparator and to use each of the outputs to set at least one of the first threshold value, the second threshold value, and the third threshold value.

In another embodiment, the fingerprint image sensor is logically divided into a plurality of regions.

In accordance with a second aspect of the present invention, a method of detecting the presence of a patterned object on a sensor comprises sensing an image of the patterned object on the sensor; generating data corresponding to the image; calculating one or more statistics related to the data; determining whether the statistics exceed corresponding threshold values; and making the data available to a host computer in the event that the statistics exceed the corresponding threshold values.

DETAILED DESCRIPTION OF THE INVENTION

Figure 1:
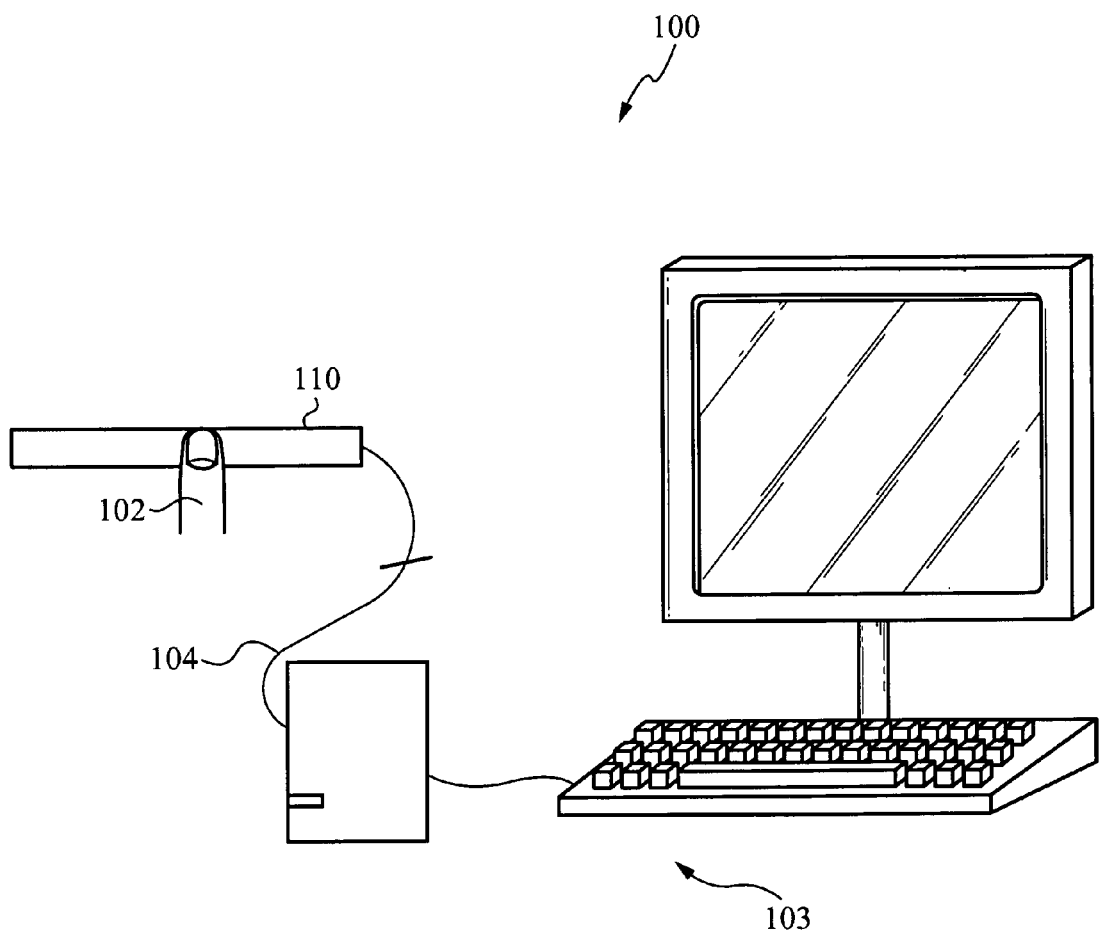
FIG. 1 shows a system for determining the presence of a finger upon a fingerprint swipe sensor in accordance with the present invention.

Embodiments of the present invention allow host systems that process a number of tasks, including processing fingerprint image data, to operate more efficiently. In accordance with embodiments of the present invention, a host system is coupled to a fingerprint sensor system. The sensor system reads images of a fingerprint or portions of a fingerprint and translates the images into digital image data that are made available to a host, which performs a variety of tasks using image data including, but not limited to, authenticating a user, launching a computer program corresponding to the image data, and emulating a computer input device such as a mouse or joystick. Systems for and methods of fingerprint sensing are described in detail in U.S. patent application Ser. No. 10/194,994, filed Jul. 12, 2002, and titled "Method and System for Biometric Image Assembly from Multiple Partial Biometric Scans" and U.S. patent application Ser. No. 10/099,558, filed Mar. 13, 2002, and titled "Fingerprint Biometric Capture Device and Method with Integrated On-Chip data Buffering," both of which are hereby incorporated by reference.

In accordance with embodiments of the present invention, the host system is interrupted by the fingerprint sensor system only when it is determined that a finger is present on a fingerprint sensor. Thus, the host system is not continually interrupted by the fingerprint sensor system, nor is it required to unnecessarily process data that does not correspond to a fingerprint. Thus, instead of unnecessarily handling interrupts when a finger is not present, requiring the processing of context switches and the like, the host system needs to service an interrupt only when there is fingerprint image data that need processing.

In accordance with other embodiments of the present invention, a host system forming part of the fingerprint sensor system and components of the fingerprint sensor system are able to be placed into extremely low-power discontinuous controlled operation. The host system is thus able to be powered down into sleep mode, awoken only when the fingerprint sensor has detected the presence of a finger. The fingerprint sensor system is able to process and detect the presence of a finger based on any sub-frame images of the complete finger image. The ability to process and detect the presence of a finger based on sub-images even further reduces the power consumption of the device.

In a preferred embodiment, the system comprises a software programmable pipelined image processor integrated into the data path of the sensor. The system further comprises a software-programmable threshold based capacitive detector, a mean image processing engine, a variance image processing engine, and an ac-energy-estimation engine, components collectively referred to as a programmable pipeline image processor. Preferably, each processor in the pipeline is software configurable to allow dynamic operation. A selectable architecture allows each stage of the pipeline image processor to be enabled or disabled to determine whether a finger is present. Furthermore, each pipeline stage of the image processor can be used during normal sensor operation.

The data from the mean, variance and ac-energy-estimation engines is transferred to the host with the fingerprint image data to reduce the processing load on the host processor during subsequent image analysis.

The programmable capacitive detector provides for the low-power discontinuous operation. As described in more detail below, in operation, the analog-to-digital converter, mean image processor, variance image processor, and ac-energy-estimation processor, referred to as the calculation components, are all placed in a sleep mode or powered off to conserve energy. It will be appreciated that components other than or in addition to the calculation components (collectively referred to as the controlled sensor components) can also be placed in a sleep mode or powered off. The software programmable capacitive detector is constantly or periodically checking based on a programmable interval for the presence of an object on the fingerprint sensor of the present invention. Only after the programmable capacitive detector detects the presence of an object upon a surface of the fingerprint sensor are the controlled sensor components enabled. Thus, when the programmable capacitive detector has not detected an object on the surface of the finger image sensor, the controlled sensor components draw little or no current, conserving system energy and further decreasing the temperature of the system. When the programmable capacitive detector does detect an object on the surface of the finger sensor, the controlled sensor components are turned on and, in accordance with the present invention, used to determine whether the object is a finger.

The present invention makes use of quantifiable statistical properties associated with fingerprints and other patterned objects. Generally, a ridge of a fingerprint (because it directly contacts a surface of a sensor) will generate a high capacitance value on a capacitance sensor or appear as a dark portion on an optical sensor. Valleys will correspondingly generate a lower capacitance value of a capacitance sensor or appear as a light portion on an optical sensor. Because ridges and valleys alternate on a finger surface, pixel values corresponding to portions of the fingerprint also alternate. Thus, if a pixel value corresponding to a portion of a fingerprint is represented by an integer between 0 and 15 (representable by 4 bits), then the pixel values of all the portions will vary between smaller values (generally representing a valley) and larger values (representing a ridge). Taken as a whole, the pixel values related to an entire (or at least larger portion of a) fingerprint will thus typically have associated statistics, such as a mean value larger than a first threshold, a variance larger than a second threshold, and a number of alternations between ridges and values (i.e., crossings) larger than a third threshold. These statistics, taken alone or in combination, can be used to identify a fingerprint and thus the presence of a finger on a sensor.

It will be appreciated that other patterned objects also have expected mean, variance and ac-energy. Thus, their presence can also be detected in accordance with the present invention. Other patterned objects include, but are not limited to, other biometric objects such as palms and eyes (with veined patterns, etc.), as well as styluses or patterned styluses, such as those used to input data into electronic devices such as personal digital assistants.

FIG. 1 is a system 100 for sensing and processing fingerprint images in accordance with the present invention. The system 100 comprises a fingerprint sensor system 110 coupled by control and data lines 104 to a host system 103. Preferably, the fingerprint sensor system 110 comprises a fingerprint swipe sensor, and in accordance with this preferred embodiment, FIG. 1 shows a finger 102 swiping over the fingerprint sensor system 110. In this preferred embodiment, the fingerprint sensor is an Atrua Wings ATW 100 capacitive swipe sensor by Atrua Technologies, Inc., at 1696 Dell Avenue, Campbell, Calif. 95008. Other embodiments of the present invention substitute a placement sensor for the fingerprint swipe sensor. It will be appreciated that many types of sensors can be used in accordance with the present invention including, but not limited to, capacitive sensors, thermal sensors, and optical sensors.

In operation, when the fingerprint sensor system 100 detects the presence of a finger, it sends an interrupt signal on an interrupt line, which is one of the control and data lines 104. The fingerprint sensor system 100 can also make the fingerprint image data available on other of the control and data lines 104. When ready, the host system 103 handles the interrupt by reading fingerprint image data on one or more of the control and data lines 104. The host system 103 then processes the fingerprint image data in any number of ways, such as by (1) verifying that a template corresponding to the read print matches a template stored on the host system 104 and corresponding to an authorized user or (2) launching a program corresponding to the read template, among other tasks. Thus, in accordance with the present invention, the host system processes other tasks and only interrupts processing those tasks to process fingerprint image data read from the fingerprint sensor system 110 when the presence of a finger has been detected and there is fingerprint image data to process. Steps used to perform a method in accordance with one embodiment of the present invention are explained in more detail in FIG. 6 below.

Figure 2:
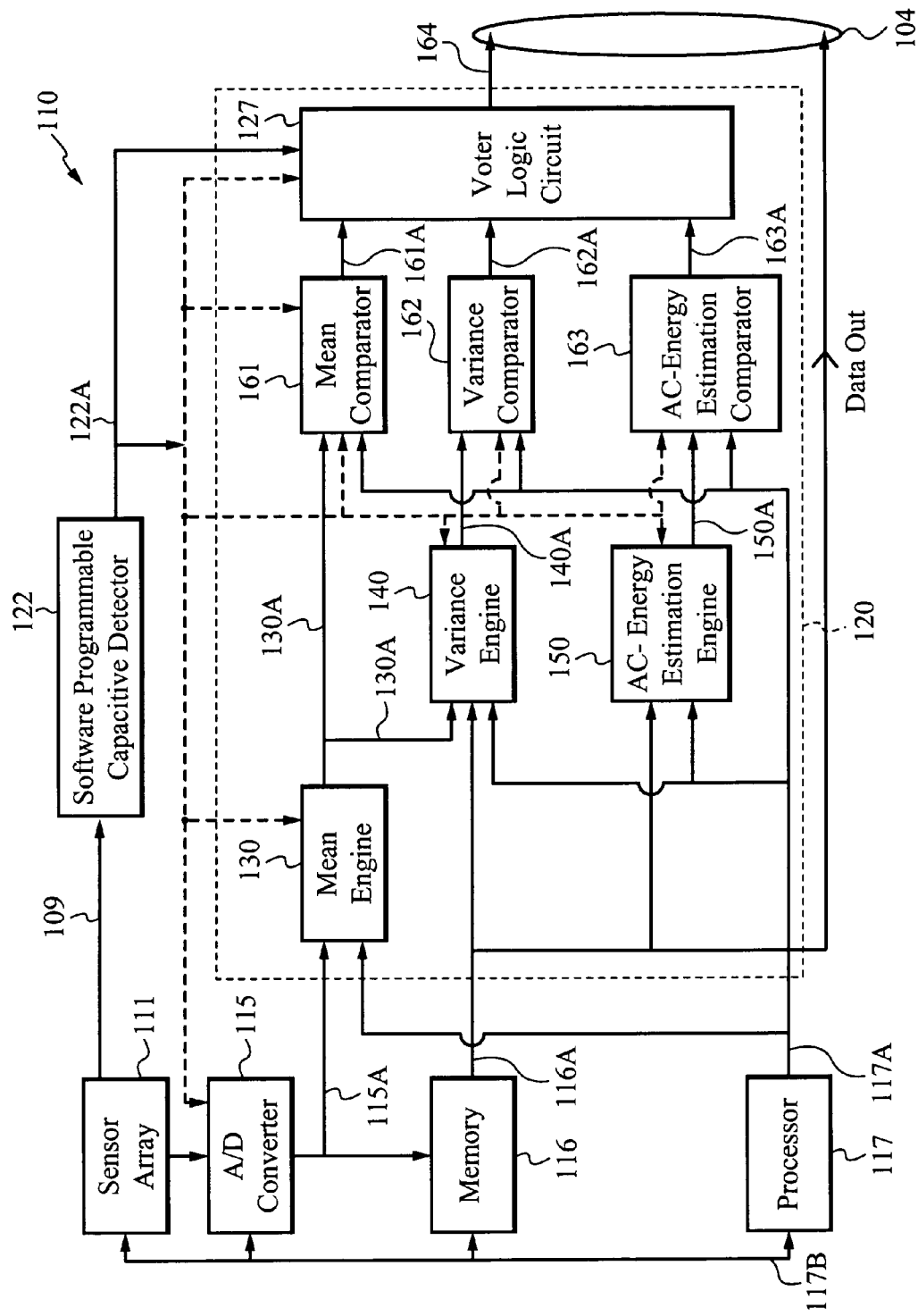
FIG. 2 is a block diagram of components of the system of FIG. 1 in accordance with one embodiment of the present invention.

FIG. 2 is a block diagram of the components of the fingerprint sensor system 110 of FIG. 1. The fingerprint sensor system 110 comprises a sensor array 111 coupled to an analog-to-digital (A/D) converter 115, which in turn is coupled to a memory 116. A processor 117 is coupled by a channel 117B to each of the sensor array 111, the A/D converter 115, and the memory 116. The processor 117 contains control logic for performing steps in accordance with a method of the present invention, described in more detail below. The memory 116 is coupled by a channel 116A to a variance engine 140 and to an ac-energy-estimation engine 150. The channel 116A also extends to provide one or more signal lines 104 from the memory 116 to a host computer system (not shown) that will process the image data stored in the memory 116. The A/D converter 115 is coupled by a channel 115A to a mean engine 130, and the memory 116 is coupled by a channel 116A to the variance engine 140. A channel 117A couples the processor 117 to the mean engine 130, the variance engine 140, the ac-energy estimation engine 150, a mean comparator 161, a variance comparator 162, and an ac-energy-estimation comparator 163. The mean engine 130 is coupled by a channel 130A to the variance engine 140 and the mean comparator 161. The variance engine 140 is coupled by a channel 140A to the variance comparator 162. The ac-energy-estimation engine 150 is coupled by a channel 150A to the ac-energy-estimation comparator 163. A voter logic circuit 127 is coupled to the mean comparator 161 by a channel 161A, to the variance comparator 162 by a channel 162A, and to the ac-energy estimation comparator 163A by a channel 163A. The voter logic circuit 127 comprises an output line 164. The mean engine 130, the variance engine 140, the ac-energy-estimation engine 150, the mean comparator 161, the variance comparator 162, the ac-energy-estimation comparator 163, and the voter logic circuit 127 are collectively referred to as a statistic engine 120. It will be appreciated that the sensor array 111 can be integrally formed with other circuits and can also be discretely formed.

The fingerprint sensor system 111 further comprises a software programmable capacitive detector 122 coupled to the sensor array 111 by the line 109 and to other electronic components to enable any one or more of them that are quiescent, that is, normally in sleep mode or off to conserve power, including the A/D converter 115, the mean engine 130, the variance engine 140, the ac-energy estimation engine 150, the mean comparator 161, the variance comparator 162, the ac-energy estimation comparator 163, and the voter logic circuit 127.

Figure 3:
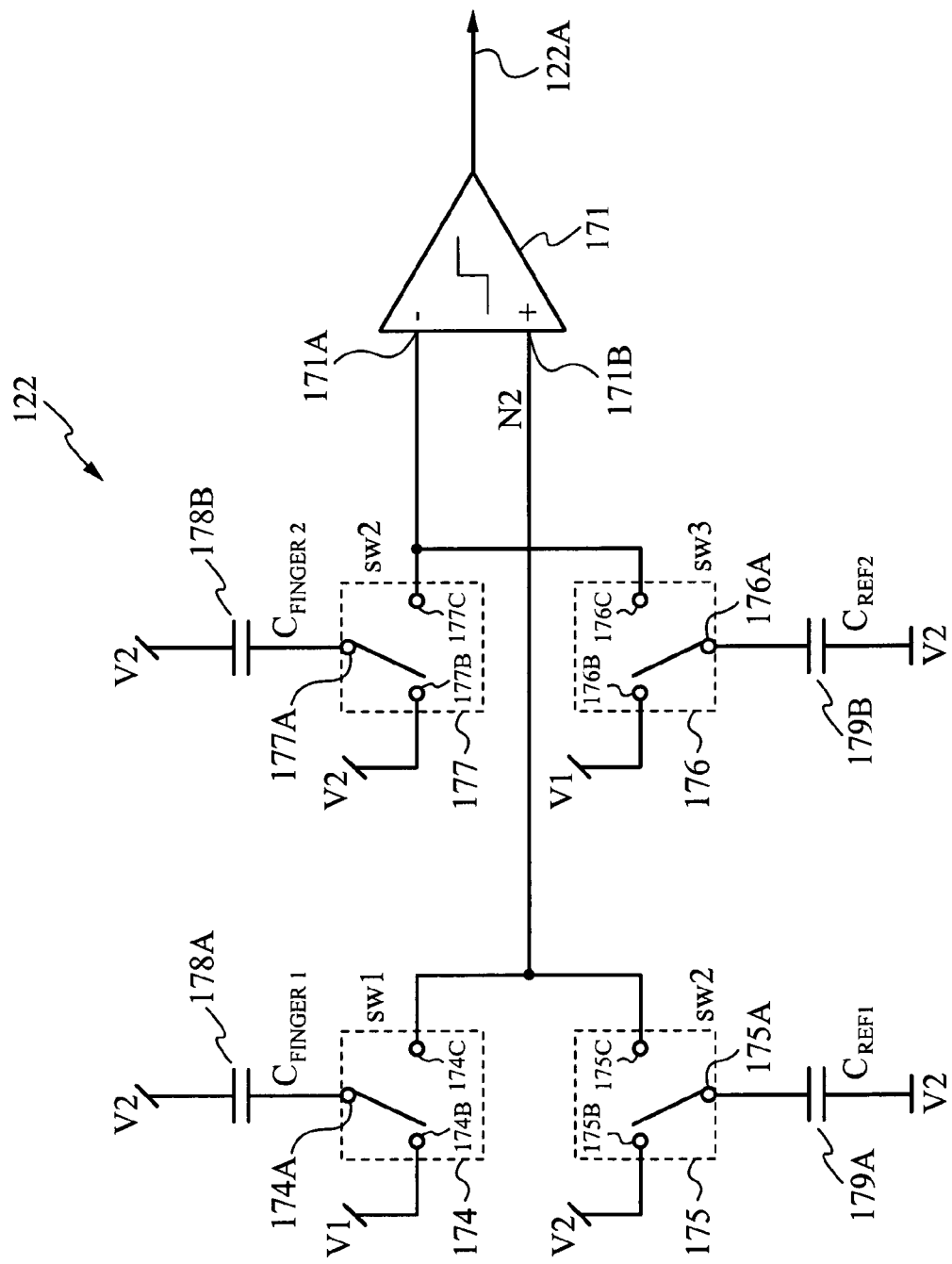
FIG. 3 shows a programmable capacitive detector for detecting the presence of an object on a fingerprint sensor in accordance with the present invention.

FIG. 3 is one embodiment of the software programmable capacitive detector 122 in accordance with the present invention. The capacitive detector 122 is configured to detect the capacitance of a near field object such as a finger. As described in more detail above, the software programmable capacitive detector 122 is used to turn on the analog-to-digital and other components of the system, so that when a finger is not present, system components are put to sleep and the system draws less power. Moreover, the capacitive detector 122 is able to be programmed so that it will trigger (and thus turn on the analog-to-digital components) when it detects the programmable capacitances, thus allowing the sensitivity of the system to be tuned.

The capacitive detector 122 comprises a comparator 171 having a first input 171A and a second input 171B, both coupled to a capacitive bridge, described below. The first input 171A is coupled to a contact 177C of a switch 177 and to a contact 176C of a switch 176. The switch 177 also has a contact 177B coupled to a voltage source V2 and an input 177A coupled to a voltage source V2 by a sense capacitor $C_{FINGER2}$ 178B. The switch 176 also has a contact 176B coupled to a voltage source V1 and an input 176A coupled to a voltage source V2 by a capacitor $C_{REF2}$ 179B. The second input 171B of the comparator 171 is coupled to a contact 174C of a switch 174 and to a contact 175C of a switch 175. The switch 174 also has a contact 174B coupled to a voltage source V1 and an input 174A coupled to a voltage source V2 by a sense capacitor $C_{FINGER1}$ 178A. The switch 175 also has a contact 175B coupled to a voltage source V2 and an input 175A coupled to a voltage source V2 by a capacitor $C_{REF1}$ 179A.

For ease of discussion, when any of the switches 174-177 is switched so that its input (e.g., 174A) is coupled directly to a voltage source (e.g., 174B), the switch is said to be in a charging position; when the switch is switched so that its input (e.g., 174A) is coupled to a voltage source through one of the capacitors (e.g., 179A, 179B, 178A, and 178B), the switch is said to be in a detection position. When a switch 174-177 is in a charging position, the capacitor coupled to its input (178A, 179A, 179B, and 178B, respectively) is charged to the software programmable value (V1, V2, V2, and V2, respectively). Those skilled in the art will recognize that in the detection position, the capacitors 178A, 178B, 179A, and 179B form a capacitive bridge.

The capacitors 179A and 179B are not exposed to a finger. The sense capacitors 178A and 178B, in contrast, are exposed to a finger (e.g., the two are brought relatively close to each other that a capacitance of the finger is detected by a sense capacitor) and are used to perform surface detection of a near field object, such as a finger. In a preferred embodiment, the sense capacitors 178A and 178B form part of the sensor array 111 and are thus shown as coupled to the sensor array by the line 109.

In operation, each of the switches 174-177 is first placed in a charging position until each of the capacitors 178A, 178B, 179A, 179B is fully charged. Next, each of the switches 174-177 is switched to a detection position so that the capacitive bridge is balanced. When a finger contacts a sense capacitor 178A and 178B, the effective capacitance of the contacted sense capacitor 178A and 178B increases, and the capacitive bridge trips. In other words, when all of the switches are placed in a detection position, the difference between the values on the sense capacitors 178A and 178B and the capacitors 179A and 179B will generate a voltage difference between the inputs 171A and 171B of the comparator 171, thus generating a signal on the output line 122A of the comparator 171. Thus, by adjusting the programmable values of the capacitors $C_{REF1}$ and $C_{REF2}$, the values of $C_{FINGER1}$ and $C_{FINGER2}$ that will be generated on output line 122 (indicating the presence of a finger and thus turning on analog-to-digital components) can be adjusted.

It will be appreciated that many of the components illustrated in FIGS. 2 and 3 are optional. Furthermore, while FIG. 3 illustrates a programmable capacitive detector, those skilled in the art will recognize other systems and methods for detecting the presence of an object in accordance with the present invention.

Figure 4:
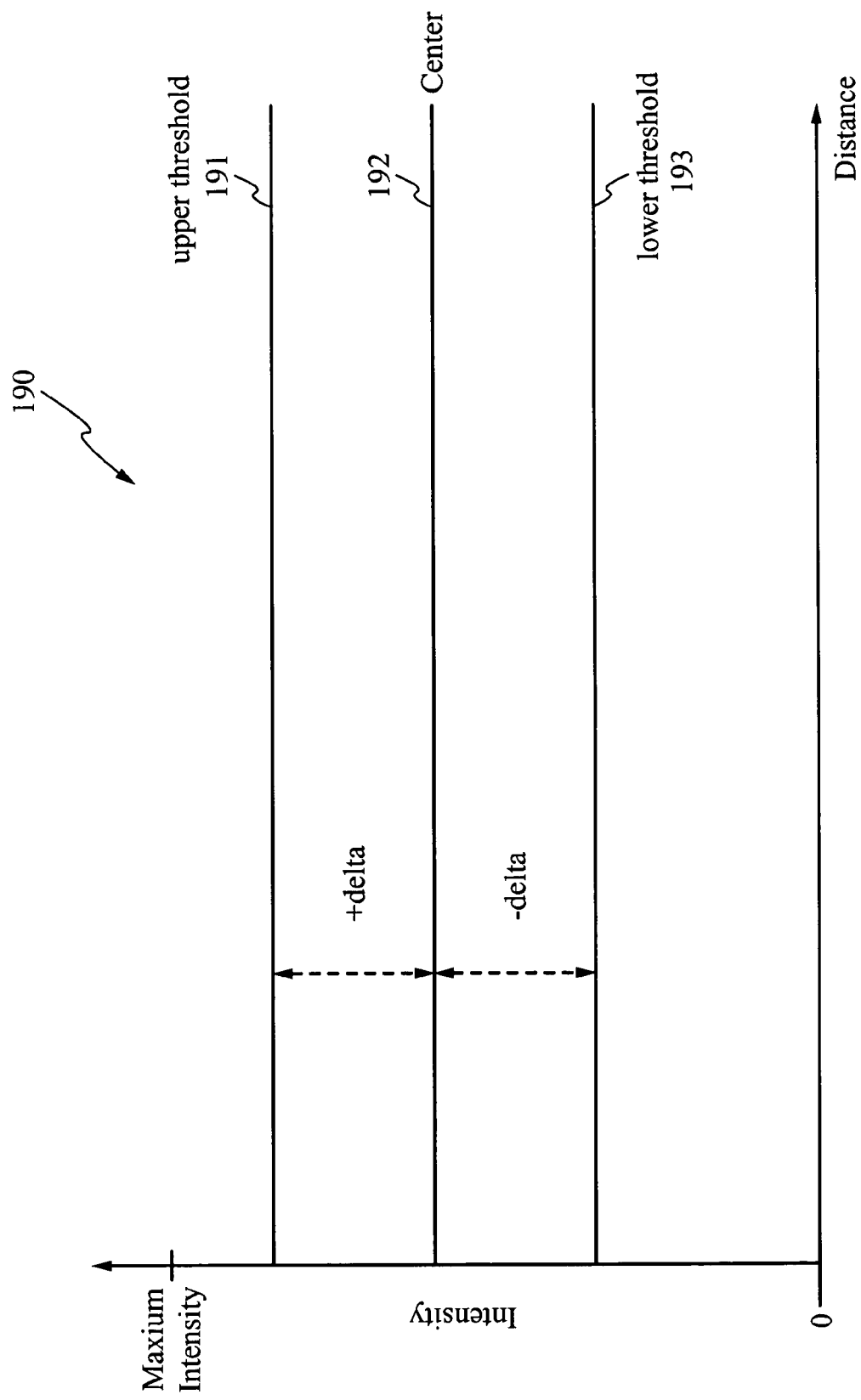
FIG. 4 is a graph of pixel intensity levels used to determine fingerprint ridge crossings in accordance with the present invention.
Figure 5:
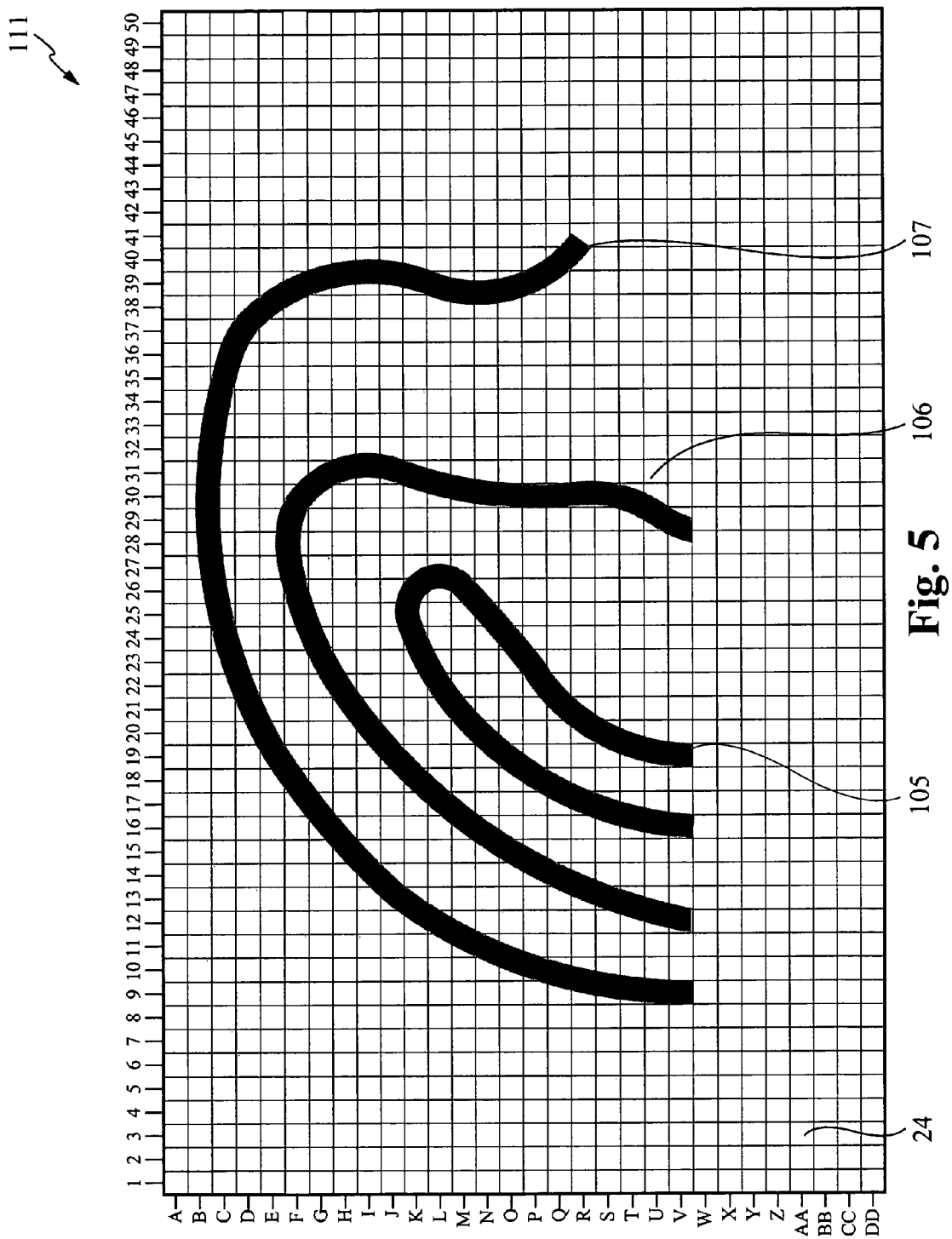
FIG. 5 is a schematic of a frame on a sensor array while a finger is present upon it in accordance with the present invention.

FIGS. 4 and 5 are now referred to, to explain how characteristics of ridge and valleys of a fingerprint are used to detect the presence of a finger in accordance with the present invention. The detection of ridges and valleys can be explained in reference to AC energy. The largest source of AC energy in a fingerprint is due to the ridge structure. FIG. 4 is a graph 190 of the threshold crossing mechanism (one technique to detect the presence of AC energy). Intensity is measured on the vertical axis and the distance along the sensor is shown on the horizontal axis of the graph 190. The graph 190 shows lines indicating an upper threshold value 191, a center value 192, and a lower threshold value 193. The ridge structure in a fingerprint causes the energy in the frequency domain to be localized. This permits the use of a Fourier Transform of band-pass filter to detect this AC energy. Measuring this AC energy is a way to determining whether a finger is present on a sensor. A finger is determined to be on the sensor when the AC energy is large.

The AC energy can be measured using a Fourier Transform or a band-pass filter and can be estimated using threshold crossings. The computation of the Fourier Transform and the bandpass filtering are computationally expensive. Although threshold crossings are an estimate of the AC energy, they can be computed with fewer computational resources.

Threshold crossings look at the gray level intensity of a frame and count how many times the level moves from above the upper threshold 191 to below the lower threshold 193 and from below the lower threshold 193 to above the upper threshold 191. The upper and lower thresholds 191 and 193 are set at positive deltas (+deltas) and negative deltas (−deltas) relative to the center intensity value 192. The center value 192 and the delta count (+delta and −delta) are both software programmable. In an alternative embodiment the center value 192 is set by the mean engine (e.g., FIG. 2, 130). In yet another embodiment, the center value 192 is set by the mean engine and the delta is a function of the variance engine (e.g., FIG. 2, 140).

FIG. 5 depicts the sensor array 111 and the corresponding pixel data used to described statistics in accordance with the present invention. The pixel data correspond to a frame of data captured by the sensor array 111 after a user has swiped or placed his finger on the sensor array 111. For purposes of this discussion, the rows of the array 111 are labeled from A to Z to AA to DD. The columns are numbered from 1 to 50. Each cell defined by the intersection of a row and a column is labeled by appending the row label to the column number.

Thus, the cell found at the intersection of row Z and column 4 has been labeled in FIG. 4 as Z4.

Referring to FIG. 5, the dark patterns 105, 106, and 107 each corresponds to a ridge on the fingerprint. Depicting a ridge as a dark pattern (e.g., with an intensity value 15) and a valley as a light pattern (e.g., with an intensity value 0) is arbitrary, chosen only to aid in the present discussion. It will be appreciated that ridges can instead be identified as light or intermediate colors and valleys as dark colors. In one embodiment, a ridge or valley that partially fills a cell has some intermediate pixel value, between 0 and 15.

Using row V as an example, cells V1-8, V10-11, V13-15, V17-18, V20-28, and V30-50 are all depicted as light colored, thereby having a relatively small intensity value; cells V9, V12, V16, V19, and V29 are all depicted as dark colored, thereby having a relatively larger intensity value. Those skilled in the art will recognize how to compute the mean and variance of the cell values in row V. As long as the dark and light intensities correspond to the threshold crossings of upper and lower thresholds, the number of threshold crossings refers to the total number of transitions from a light colored to a dark-colored cell or from a dark-colored to a light-colored cell. For this reason, the ac-energy estimation comparator 163 of FIG. 2, which is used to determine threshold crossings, is also referred to as a spatial frequency processor.

In one embodiment, a transition is recognized when adjacent cell values change from a first value to another value below a first threshold or from a first value to another value above a second threshold. Thus, referring to FIG. 5, the transition from the light-colored cell V8 to the dark colored cell V9 (from a value to another value above the second threshold) counts as one transition. Similar transitions occur from cell V9 to cell V10 (from dark to light, or from a value to another value below the first threshold), V11 to V12 (light to dark), V12 to V13 (dark to light), V15 to V16 (light to dark), V16 to V17 (dark to light), V18 to V19 (light to dark), V19 to V20 (dark to light), V28 to V29 (light to dark), and V29 to V30 (dark to light). Row V thus has a total of ten transitions or threshold crossings. Preferably, threshold crossings are computed on one row per frame. Similar statistics are counted for all the rows in the array 111 and a running count kept, as described in more detail in relation to FIGS. 7-9.

Many variations can be made to the steps for generating statistics in accordance with the present invention. For example, rather than traveling row-by-row, the method can travel column-by-column. Furthermore, it will be appreciated that cells can have grey-scale values (shades) other than all dark or all light. Cells can also contain intermediate values reflecting intermediate shades corresponding, for example, to pores, scars, and other features. The system can be tuned by setting threshold values. For example, to ensure that a small scar is not recognized as a transition, an upper threshold can be increased so that only ridges, which have large binary values, will be recognized as threshold crossings. These thresholds can be programmed into the components of the present invention or can be dynamically set by an executing software program, dynamic in that the system uses previous threshold crossings to generate new threshold values. In this way the system can be tuned to better distinguish between ridges and valleys.

It will be appreciated that while FIG. 5 shows a sensor array 111 with 50 columns and 30 rows, the sensor array 111 can have any number of rows and columns. In a preferred embodiment, the sensor array 111 forms part of a capacitive swipe sensor with 192 columns and 8 rows. In one embodiment, the 192 columns and 8 rows correspond to a single frame of data for which threshold crossings are computed.

Figure 6:
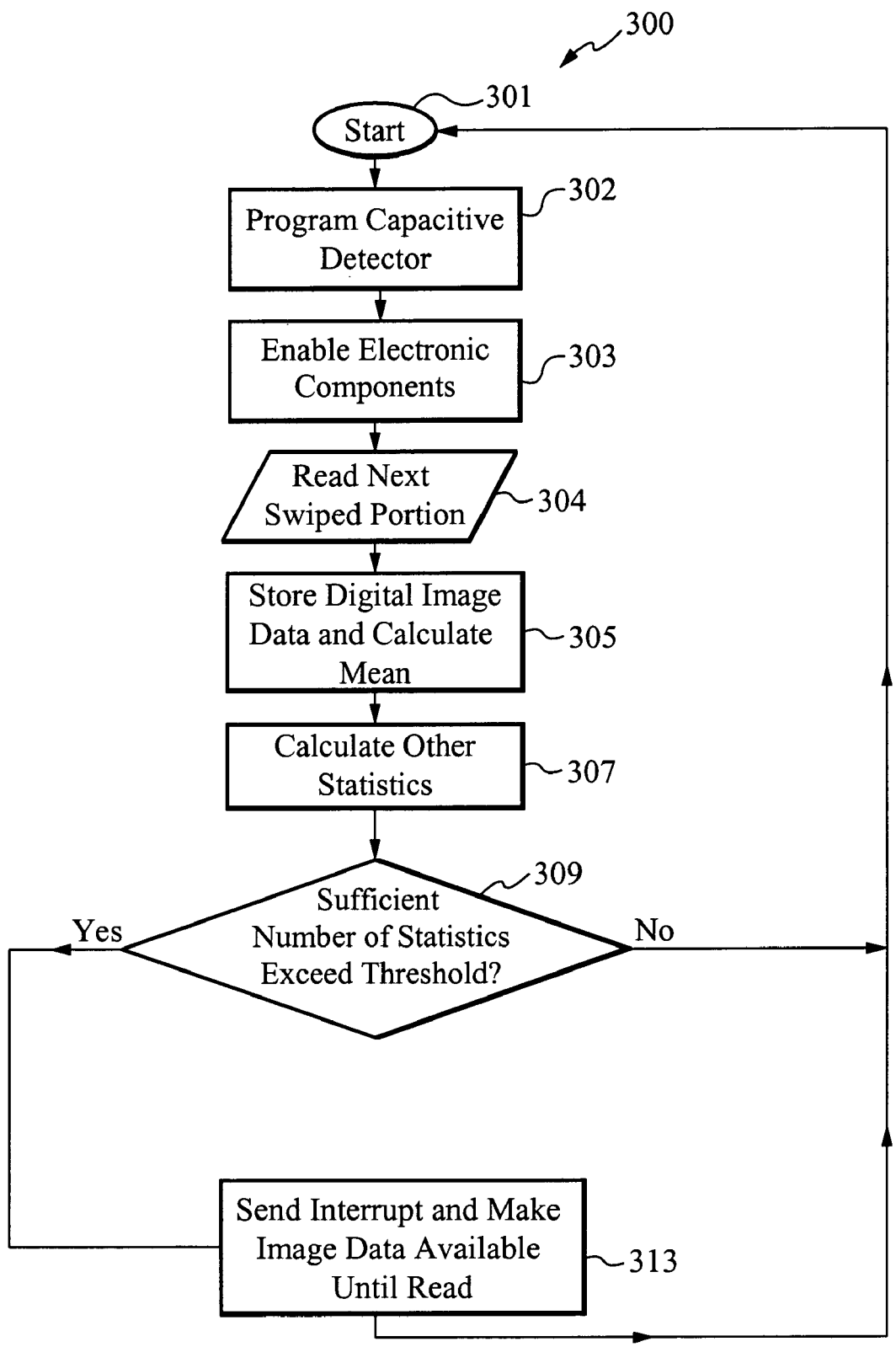
FIG. 6 is a flow chart showing the steps used to detect the presence of a finger on a sensor in accordance with embodiments of the present invention.

The operation of the system 100 in accordance with the present invention is now described with reference to FIGS. 1, 2, 6. FIGS. 1 and 2 have been described above. FIG. 6 is a flow chart of the steps 300 used to detect the presence of a finger on the fingerprint swipe sensor 110.

Referring to FIG. 6, the steps 300 start with a start step 301, in which threshold and grey-scale levels are set, the memory 116 is cleared, and other preliminary tasks are performed. In addition, this discussion of FIG. 6 also refers to the circuit block diagram elements of FIG. 2. Next, in the step 302, the capacitive detector is programmed with threshold values and waits until it detects the presence of an object, and in the step 303 enables the electronic components that are normally in the quiescent state (e.g., FIG. 2 elements 115, 130, 140, 150, 161, 162, 163, and 127). Next, in the step 304 the processor 117 instructs the sensor array 111 to read an image of whatever is present on the sensor array 111 and instructs the A/D converter 115 to convert the image into corresponding digital image data. Next, in the step 305, the digital image data is stored in the memory 116 and processed by the mean engine 130 to calculate the mean of the digital image data. In the step 307, the variance engine 140 calculates the variance of the digital image data and the ac-energy estimation engine 150 calculates the number of threshold crossings for the digital image data. Next, in the step 309, the mean comparator 161, the variance comparator 162, the ac-energy estimation comparator 163, the software programmable capacitive detector 122 together with the voter logic circuit 127 (i.e., collectively, the statistical engine 120) determine whether sufficient statistics indicate that a finger is present on the sensor array 111.

If in the step 309 it is determined that a finger is present on the sensor array 111, then in the step 313, an interrupt signal is sent on the line 164 and the digital image data is made available to a host system on the channel 104. The channel 104 can be a serial line, a multi-line parallel bus, or any type of line on which digital data can be transmitted.

If in the step 309 it is determined that the statistics do not indicate that a finger is present on the sensor array 111, then processing loops back to the step 301.

After the system, 110, has interrupted the host, it enters a quiescent mode, in which the predetermined controlled sensor components enter sleep mode, thereby conserving power. The host can subsequently request the image data from the fingerprint sensor. The system is then reset by placing the switches 174-177 into a charging position using software programmable values for the capacitors 179A and 179B.

Referring again to FIG. 2, it will be appreciated that the mean engine 130 processes a frame of data in parallel with its being read, as it is stored in the memory 116. The mean engine 130 thus functions on-the-fly, advantageously reducing the time it takes to calculate statistics used to determine whether a finger is present on the sensor 110. It will also be appreciated that the variance engine 140 uses the mean of the digital image data and thus requires that the mean be calculated before the variance can be calculated.

Figure 7:
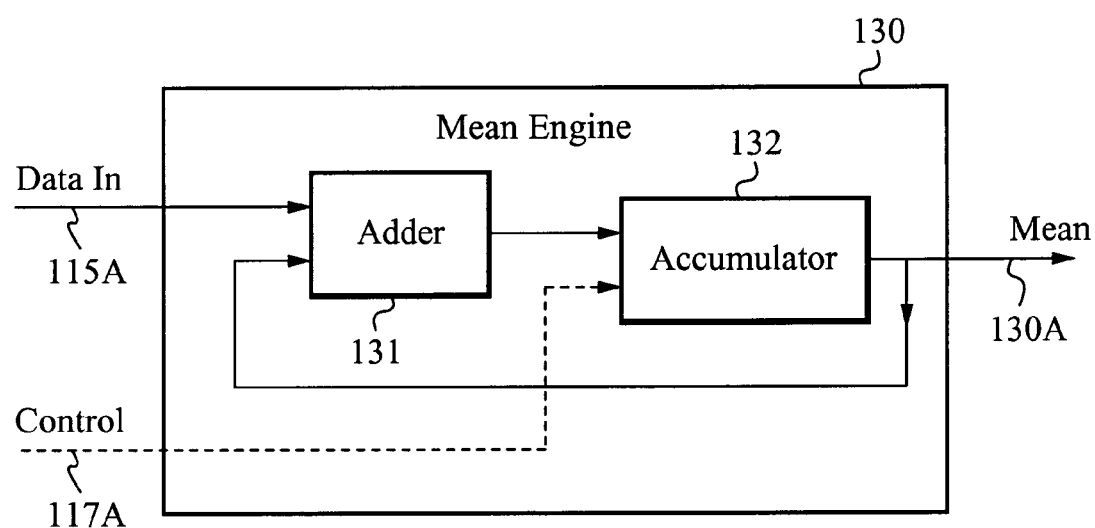
FIG. 7 is a block diagram of the components for the mean engine of FIG. 2 in accordance with one embodiment of the present invention.
Figure 8:
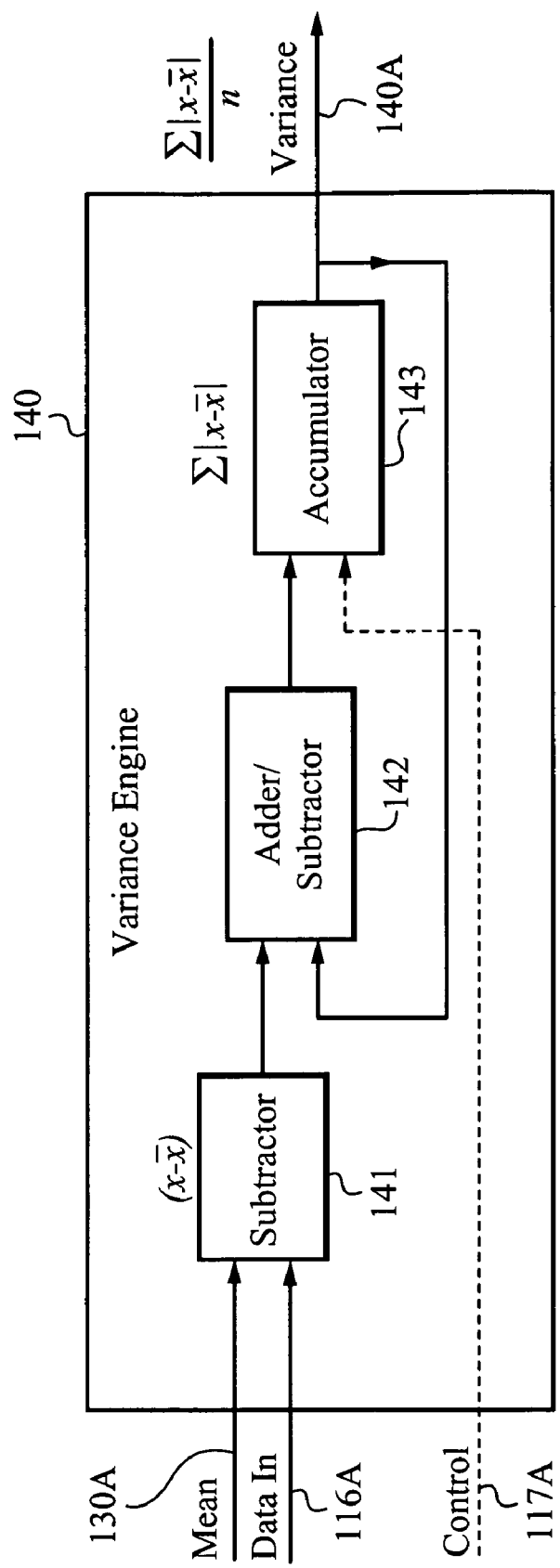
FIG. 8 is a block diagram of the components for the variance engine of FIG. 2 in accordance with one embodiment of the present invention.
Figure 9:
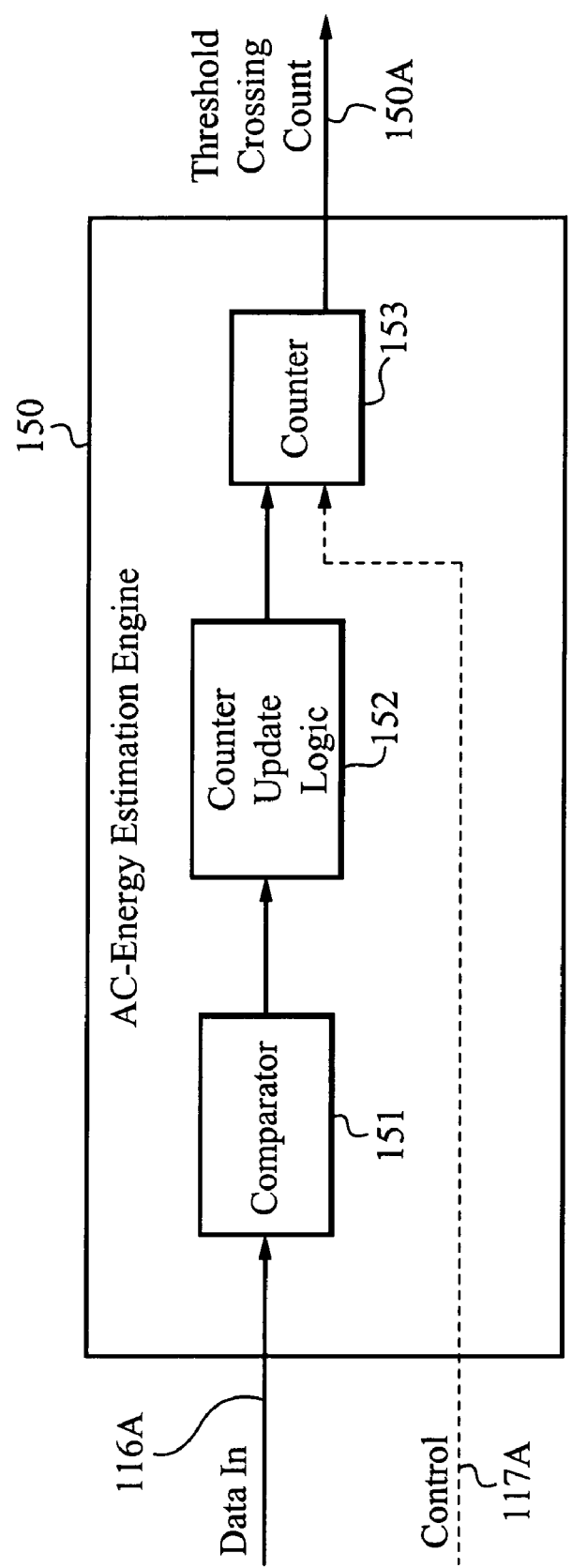
FIG. 9 is a block diagram of the components for the ac-energy-estimation engine of FIG. 2 in accordance with one embodiment of the present invention.

FIGS. 7-9 illustrate the components of the statistic engine 120 in more detail. FIG. 7 is a more detailed block diagram of the mean engine 130. The mean engine 130 comprises an adder 131 coupled to an accumulator 132. The adder 131 has a first input coupled to the data-in line 115A and a second input coupled to an output of the accumulator 132. The accumulator 132 is further coupled to the control line 117A. The adder 131 sums the pixel (cell) values on the data-in line 115A. The running sums are stored in the accumulator 132, which are fed back to the adder 131. The accumulator 132 contains further logic, such that when it receives an appropriate signal on the control line 117A, it divides the running sum by the number of cells processed to thereby compute the mean.

FIG. 8 is a more detailed block diagram of the variance engine 140. As also illustrated in FIG. 2, the variance engine 140 is coupled to the mean engine 130 by the channel 130A, to the processor 117 by the channel 117A, and to the memory 116 by the channel 116A. The variance engine 140 comprises a subtractor 141 coupled at its inputs to the lines 116A and 130A and at an output to an adder/subtractor 142, which computers the difference between the data on the data-in line 116A (x) and the data on the mean line 130A, the mean ($\bar{x}$) The adder/subtractor 142 is coupled at an output to an accumulator 143 and at an input to an output line of the accumulator 143. The accumulator 143 has an input coupled to the control line 117A and an output 140A, on which is generated the variance $(\Sigma |x-\bar{x}|)/n$.

FIG. 9 is a more detailed block diagram of the ac-energy-estimation engine 150. The ac-energy estimation engine 150 comprises a comparator 151 with an input coupled to the data-in line 116A and an output coupled to a counter-update logic circuit 152. The ac-energy estimation engine 150 further comprises a counter 153 with a first input coupled to the counter-update logic circuit 152, a second input coupled to the control line 117A, and an output 150A. The comparator 151 receives cell values and determines transitions between ridge and valleys (e.g., light-to-dark and dark-to-light transitions). These transitions are passed on to the counter-update logic circuit 152 which causes the counter 153 to keep a running count of these transitions, also referred to as threshold crossings.

Referring again to FIG. 2, the voter logic circuit 127 receives the output 161A of the mean comparator, the output 162A of the variance comparator 162A, the output 163A of the ac-energy-estimation comparator 163, and the output of the software programmable capacitance detector 122A. The voter logic circuit 127 is able to be programmed to give any desired weight to the values on the output lines 161A, 162A, 122A and 163A. For example, in one embodiment, the voter logic circuit 127 is configured to generate a signal on the line 164 (thereby generating an interrupt on a host system, not shown) when the output 161A of the mean comparator 161 is above a first pre-determined value, the output 162A of the variance comparator 162 is above a second pre-determined value, and the output 163A of the ac-energy estimation comparator 163 is above a third pre-determined value. In another embodiment, the voter logic circuit 127 is configured to generate a signal on the line 164 when the output 163A of the ac-energy estimation comparator 163 is above a fourth pre-determined value. In this other embodiment, the values on the lines 161A and 162A are ignored. It will be appreciated that the voter logic circuit 127 can be configured in any number of ways in accordance with the present invention. In alternative embodiments, components can be disabled so that their outputs are not weighed by the voter logic circuit 127. In these alternative embodiments, the voter logic circuit 127 is optional or even unnecessary.

When the host receives an interrupt and the signals representing the values of the statistics such as the mean, variance, and threshold crossings, it can do more extensive analysis on the statistics. If, after more extensive analysis the host determines that no finger was actually present on the system, the host can be used to program any one or more of the mean comparator, the variance comparator, and the ac-energy estimation comparator so that interrupts are only generated when a finger is detected. This tuning is especially important in humid environments, for example, where sweat or other residue triggers the sensor's finger detect logic.

Figure 10:
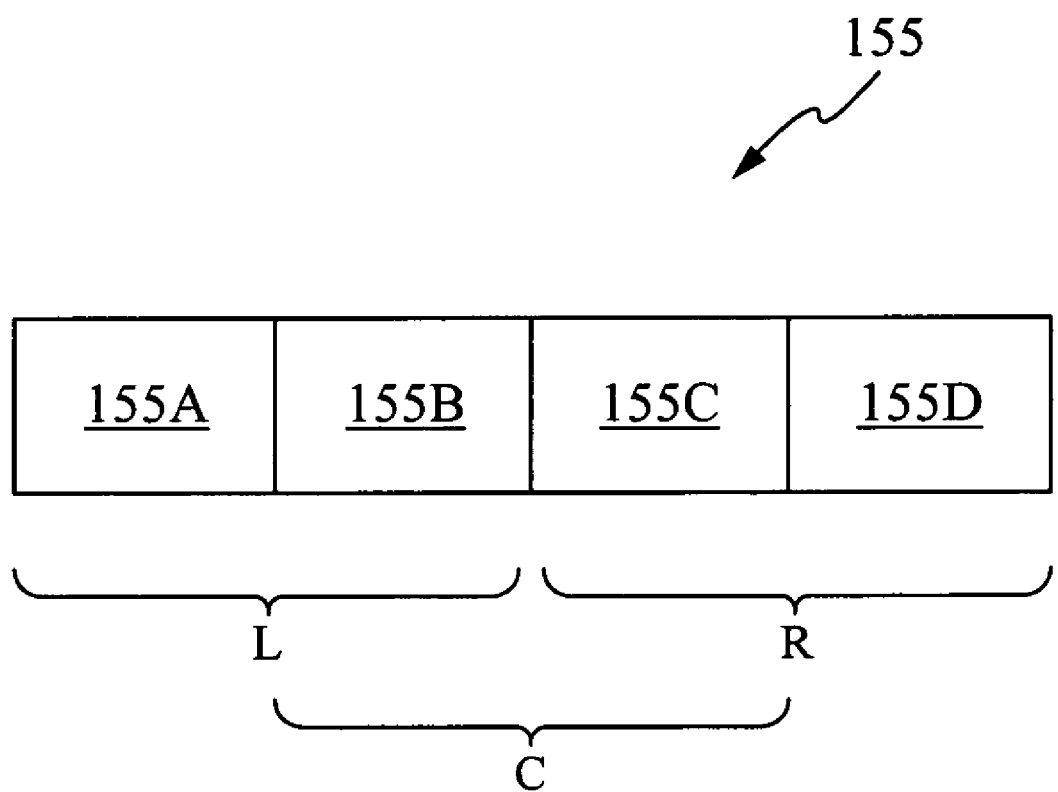
FIG. 10 shows a finger image sensor divided into a plurality of regions in accordance with the present invention.

In accordance with the present invention, finger sensors can be divided into one or more logical regions and the presence of a finger detected in any region. In some embodiments, finger sensors are partitioned to emulate, for example, input devices such as computer mice, which recognize and process inputs based on the regions in which a finger is detected. FIG. 10, for example, shows a finger image sensor 155 logically divided into regions 155A-D. Thus in one embodiment in which a finger sensor is used to emulate a computer mouse, for example, the regions 155A and 155B together correspond to a left mouse button (L), the regions 155B and 155C together correspond to a center mouse button (C), and the regions 155C and 155D together correspond to a right mouse button (R). Systems and methods for dividing finger sensors into logical regions are described in more detail in U.S. patent application Ser. No. 11/056,820, titled "System and Method of Emulating Mouse Operations Using Finger Image Sensors," filed Feb. 10, 2005, which is hereby incorporated by reference. While FIG. 10 shows a finger image sensor 155 divided into four logical regions 155A-D, it will be appreciated that finger sensors in accordance with the present invention can be divided into any number of regions to fit the application at hand. Furthermore, regions can be interpreted to include contiguous non-overlapping regions (e.g., processing regions 155A and 155B as a single region such as a left mouse button), overlapping regions, and non-overlapping regions arranged as quadrants.

Embodiments of the present invention contemplate many modifications. For example, the system and method of the present invention can include logic to translate digital image data into a template, which is then read by the host when the interrupt signal is raised on the line 104 in FIG. 2. This structure advantageously allocates the heavy processing to the fingerprint sensor system of the present invention rather than the host system. Because the host system does not have to generate the template, it can devote even more processing time to other processes executing on it. Indeed, as soon as it receives the template, the host system need only perform such tasks as comparing the generated template to stored templates to check for a match. It will be readily apparent to one skilled in the art that various modifications may be made to the embodiments without departing from the spirit and scope of the invention as defined by the appended claims.

We claim:

1. An apparatus for determining a presence of a patterned biometric object, the apparatus comprising:

a biometric sensor system configured to detect a presence of the patterned biometric object, to sense an image corresponding to the patterned biometric object and to translate the image into image data;

logic configured to be enabled based upon detecting the presence of the patterned biometric object, and to determine multiple values corresponding to multiple different statistical properties of the image data the logic comprising a plurality of statistical engines for the corresponding multiple values, and a plurality of comparators coupled to said plurality of statistical engines for generating output signals, the output signals indicating when the multiple values exceed a corresponding number of threshold levels; and a signal generator configured to receive the output signals generate a wake up signal in the event a predetermined combination of the multiple values exceed a corresponding number of threshold levels.

2. The apparatus of claim 1, wherein the biometric sensor system comprises:
   a biometric image sensor; and
   a signal converter coupled to the biometric image sensor.

3. The apparatus of claim 2, further comprising:
   a memory coupled to the signal converter, the memory containing one or more output lines for coupling to a host system; and
   a processor coupled to the biometric image sensor, the signal converter, the memory, and the logic.

4. The apparatus of claim 3, wherein the signal converter comprises an analog-to-digital converter.

5. The apparatus of claim 4, wherein the biometric image sensor is a fingerprint image sensor.

6. The apparatus of claim 5, wherein the fingerprint image sensor is a swipe sensor.

7. The apparatus of claim 5, wherein the fingerprint image sensor is a placement sensor.

8. The apparatus of claim 6, wherein the swipe sensor is a capacitive sensor.

9. The apparatus of claim 6, wherein the swipe sensor is one of thermal sensor and an optical sensor.

10. The apparatus of claim 5, wherein the logic comprises:
    a first statistical engine coupled to the analog-to-digital converter and the processor;
    a second statistical engine coupled to the memory, the first statistical engine, and the processor; and
    an ac-energy-estimation engine coupled to the memory and the processor.

11. The apparatus of claim 10, wherein the logic further comprises:
    a first comparator coupled to the first statistical engine and the processor, the first comparator configured to generate a first output when the output of the first statistical engine exceeds a first threshold value;
    a second comparator coupled to the second statistical engine and the processor, the second comparator configured to generate a second output when the output of the second statistical engine exceeds a second threshold value; and
    a third comparator coupled to the ac-energy-estimation engine and the processor, the third comparator for generating a third output when the output of the threshold crossing engine exceeds a third threshold value.

12. The apparatus of claim 11, wherein the biometric sensor system comprises a software programmable detection engine coupled to and configured to enable the analog-to-digital converter, the first statistical engine, the second statistical engine, and the ac-energy-estimation engine.

13. The apparatus of claim 12, wherein the software programmable detection engine comprises a software programmable capacitive bridge.

14. The apparatus of claim 13, wherein the software programmable capacitive bridge comprises one or more capacitors configured to be programmed to a detection threshold level.

15. The apparatus of claim 11, wherein the first statistical engine is a mean engine and the first comparator is a mean comparator.

16. The apparatus of claim 11, wherein the second statistical engine is a variance engine and the second comparator is a variance comparator.

17. The apparatus of claim 11, wherein the third statistical engine is a ac-energy-estimation engine and the third comparator is an ac-energy-estimation comparator.

18. The apparatus of claim 11, wherein the first threshold value is related to a mean of the image data, the second threshold value is related to a variance of the image data, the third threshold value is related to an ac-energy-estimation of the image data and the fourth threshold value is related to the software programmable capacitance detection.

19. The apparatus of claim 11, wherein at least one of the first comparator is configured to be programmed with the first threshold value, the second comparator is configured to be programmed with the second threshold value, and the third comparator is configured to be programmed with the third threshold value.

20. The apparatus of claim 11, further comprising a host platform coupled to the logic.

21. The apparatus of claim 20, wherein the one or more output lines are coupled to the host platform.

22. The apparatus of claim 21, wherein the host platform comprises an interrupt signal line coupled to at least one of the first comparator, the second comparator, and the third comparator.

23. The apparatus of claim 22, wherein the signal generator comprises a voter circuit comprising the interrupt signal line, the voter circuit coupled to the first comparator, the second comparator, and the third comparator.

24. The apparatus of claim 20, wherein the host platform comprises a personal computer.

25. The apparatus of claim 20, wherein the host platform comprises a portable device.

26. The apparatus of claim 25, wherein the portable device comprises a device selected from the group consisting of a telephone, a personal digital assistant, a personal music player, and a camera.

27. The apparatus of claim 22, wherein the host platform is configured to receive at least one of the output from the first comparator, the output from the second comparator, and the output from the third comparator and use each of the outputs to set at least one of the first threshold value, the second threshold value, and the third threshold value.

28. The apparatus of claim 5, wherein the fingerprint image sensor is logically divided into a plurality of regions.

29. An apparatus comprising:
    a biometric sensor system configured to detect a presence of a biometric object, sense an image corresponding to the biometric object, and translate the image into image data;
    logic configured to be powered on based upon detecting the presence of the biometric object, and determine multiple values corresponding to multiple different statistical properties of the image data the logic comprising a plurality of statistical engines for the corresponding multiple values, and a plurality of comparators coupled to said plurality of statistical engines for generating output signals, the output signals indicating when the multiple values exceed a corresponding number of threshold levels; and
    a signal generator configured to receive the output signals generate a wake up signal based upon a combination of the multiple values.

30. The apparatus of claim 29, wherein the biometric sensor system comprises:
    a biometric image sensor; and
    a signal converter coupled to the biometric image sensor.

31. The apparatus of claim 30, further comprising:
    a memory coupled to the signal converter, the memory containing one or more output lines for coupling to a host system; and
    a processor coupled to the biometric image sensor, the signal converter, the memory, and the logic.

32. The apparatus of claim 31, wherein the logic comprises:
- a first statistical engine coupled to the analog-to-digital converter and the processor;
- a second statistical engine coupled to the memory, the first statistical engine, and the processor; and
- an ac-energy-estimation engine coupled to the memory and the processor.

33. The apparatus of claim 32, wherein the logic further comprises:
- a first comparator coupled to the first statistical engine and the processor, the first comparator configured to generate a first output when the output of the first statistical engine exceeds a first threshold value;
- a second comparator coupled to the second statistical engine and the processor, the second comparator configured to generate a second output when the output of the second statistical engine exceeds a second threshold value; and
- a third comparator coupled to the ac-energy-estimation engine and the processor, the third comparator for generating a third output when the output of the threshold crossing engine exceeds a third threshold value.

34. The apparatus of claim 33, wherein the first statistical engine is a mean engine and the first comparator is a mean comparator; wherein the second statistical engine is a variance engine and the second comparator is a variance comparator; and wherein the third statistical engine is a ac-energy-estimation engine and the third comparator is an ac-energy-estimation comparator.

35. The apparatus of claim 29, further comprising a host platform coupled to the logic.

36. The apparatus of claim 29, wherein the fingerprint image sensor is logically divided into a plurality of regions.

* * * * *

UNITED STATES PATENT AND TRADEMARK OFFICE
CERTIFICATE OF CORRECTION

| | | |
|---|---|---|
| PATENT NO. | : 7,831,070 B1 | |
| APPLICATION NO. | : 11/060846 | |
| DATED | : November 9, 2010 | |
| INVENTOR(S) | : Cheng et al. | |

It is certified that error appears in the above-identified patent and that said Letters Patent is hereby corrected as shown below:

Front Page, Abstract  
Line 10  
Delete: "is finger"  
Insert: --is a finger--

Front Page, Abstract  
Line 11  
Delete: "is fingerprint"  
Insert: --is a fingerprint--

Column 5, Line 36  
Delete: "of"  
Insert: --on--

Column 6, Line 59  
Delete: "163A"  
Insert: --163--

Column 8, Line 36  
Delete: "determining"  
Insert: --determine--

Column 8, Line 60  
Delete: "described"  
Insert: --describe--

Column 11, Line 12  
Delete: "computers"  
Insert: --computes--

Column 11, Line 13  
Delete: " $(\bar{x})$ "  
Insert: -- $(\bar{x})$. --

Column 11, Line 28  
Delete: "ridge"  
Insert: --ridges--

Column 12, Line 64  
Delete: "signals"  
Insert: --signals and to--

Signed and Sealed this  
Thirtieth Day of August, 2011

David J. Kappos  
*Director of the United States Patent and Trademark Office*

CERTIFICATE OF CORRECTION (continued)
U.S. Pat. No. 7,831,070 B1

| | |
|---|---|
| Column 12, Line 66 | Delete: "exceed" |
| | Insert: --exceeds-- |
| Column 13, Line 22 | Delete: "of thermal" |
| | Insert: --of a thermal-- |
| Column 13, Line 23 | Delete: "logic" |
| | Insert: --plurality of statistical engines-- |
| Column 13, Line 30 | Delete: "logic further" |
| | Insert: --plurality of comparators-- |
| Column 15, Line 1 | Delete: "logic" |
| | Insert: --plurality of statistical engines-- |
| Column 15, Line 9 | Delete: "logic further" |
| | Insert: --plurality of comparators-- |